Aug. 9, 1932.                    T. M. ROBERTS                    1,870,347
MASS MOVEMENT DETECTOR
Filed Sept. 10, 1926

Inventor
Thomas M. Roberts

Attorney

Patented Aug. 9, 1932

1,870,347

UNITED STATES PATENT OFFICE

THOMAS M. ROBERTS, OF WASHINGTON, DISTRICT OF COLUMBIA

MASS-MOVEMENT DETECTOR

Application filed September 10, 1926. Serial No. 134,683.

The invention relates to the construction and application of an electrical switch for closing and opening an indicating signal circuit. The device is enclosed and encompassed by a sealed water-proof encasement which is an essential part of the switch, which installed, buried, planted, concealed, or exposed in, near, or adjacent to, a structure, foundation, or earthy mass, will operate on an indicating signal circuit when the encasement is moved to or from an upright or oblique position, or tipped, or swung a predetermined or incidental amount from its installed setting.

The object of my invention is to serve as a detector of material mass movements in, near, or adjacent to, a structure, foundation, earth embankment or building, and such as used for a railway track, bridge, road culvert, levee and stream control, made of brick, stone, wood, earthy mass or any other material subject to internal or external movements, outside the switch encasement, by fire, water, wind, heat, cold, or any other material mass-disturbing agent or agents: and by closing or opening a circuit connected to an indicating signal to make known that a mass-disturbance, or replacement of the material supporting the encasement, has occurred either below or above the earth's surface and moved the switch detector from its installed setting relative to the earth.

My invention, then, properly installed within or outside a structure is a mass movement detector when it is disturbed, moved, tipped, or swung to or from a vertical or oblique setting an amount sufficient to join or separate electrically the opposite polarities of an indicating signal circuit to which the poles of the switch are connected.

Briefly described, the main features of my invention are: (a) an enclosed water-proof encasement, (b) the positive and negative or neutral contact elements of the switch encompassed by, and attached to, the encasement or casing, together with (c) a freely movable operating element between them, and (d) the application of the switching device connected to a circuit with an indicating signal, the combined installation of all of which serves as a detector of material mass-movements either below or above the surface of the earth.

Figure 1:
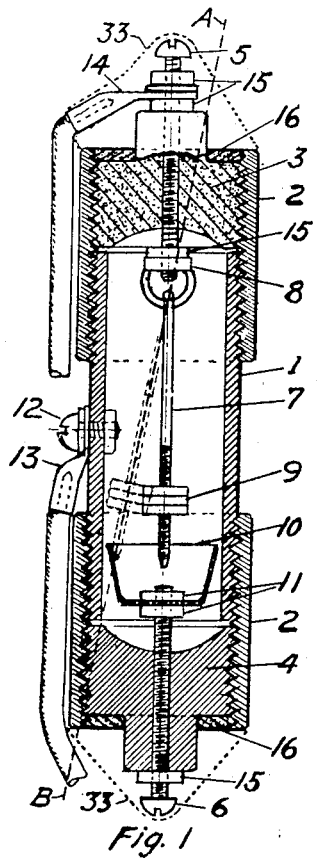
Figure 2:
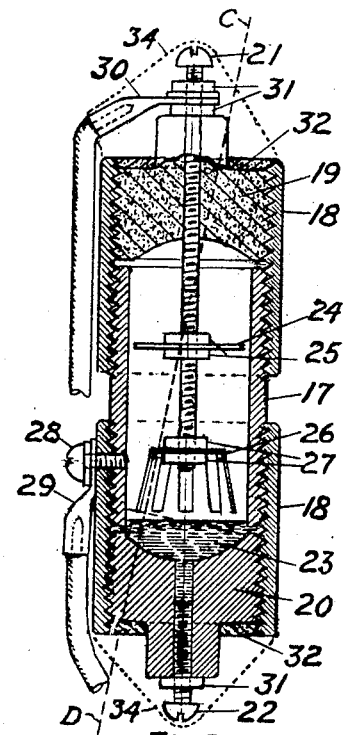

One form of the switch detector is illustrated on the accompanying drawing, in which Figures 1 and 2 are part vertical section views of the switch body and its essential working parts.

Two definitions of terms used herein will aid to describe this invention: (1) The phrases, "movable element" and "operating member" or "operating element" are used herein to mean the member of the switch that closes and opens the circuit when the axis of the switch encasement is moved. Its position relative to the earth tends to remain fixed, while its position relative to the encasement is variable according as the encasement is moved from its installed setting; (2) The term "tipping angle" is used herein to mean the angle necessary to tip or move the encasement from its installed setting relatively to the earth in order to put the movable element into make or break condition with the connected circuit, and is illustratively shown by the dash line A—B, Fig. 1, and C—D, Fig. 2.

Fig. 1 shows a metal rod for an operating member, while Fig. 2 shows a liquid for an operating member. The operating principle and working process are the same in both, and the application is the same for both figures and as set forth; for when either encasement as shown is tipped in any direction out of its setting the force of gravity tends to hold the axis of the operating rod member in a vertical position and likewise to hold the normal to the surface of the operating liquid member in a vertical line.

Figure 4:
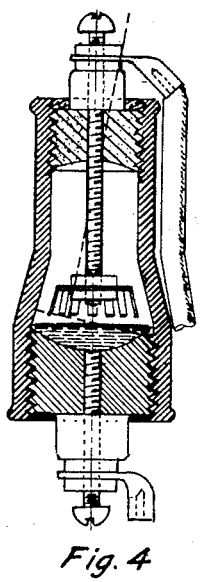
Figure 5:
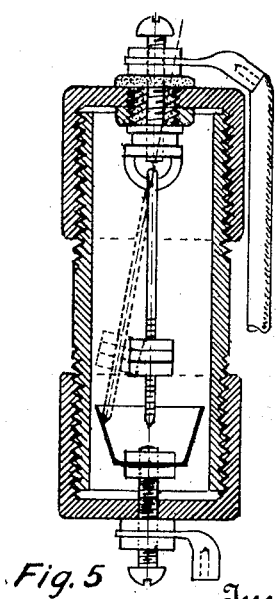

Figures 4 and 5 show encasements with a less number of parts. Fig. 4 has stock pipe reducing coupling with end plugs, as in Fig. 2, while Fig. 5 has a pipe nipple with pipe caps for enclosing the encasement, the entrance of one pole to the switch passing centrally through an insulating bushing instead of a plug. Otherwise they are essentially similar to Figs. 1 and 2, which will be described together, the same or similar parts in the two figures performing the same or similar functions being alternately mentioned.

Casing 1 in Fig. 1, and 17 in Fig. 2 is a short length of iron pipe such as a pipe nipple, threaded at each end, onto which are fitted pipe couplings 2 and 18, respectively, for attaching plugs 3 and 4 Fig. 1, and 19, 20 Fig. 2. These parts enclose the inner cavity encompassing the switch elements in each figure. The ends of the encasement, plugs 3, 4, and 19, 20, are centrally tapped for entrance of the threaded-full-length button-head pole bolts, 5 and 6, Fig. 1, and 21, 22, Fig. 2, which can be turned for varying the distance between the opposite polarities of the switch, and thus give an adjustability of the tipping angle for sensitiveness to a disturbance. One side of the circuit is grounded to the encasement, either on bolts 6 and 22 (as shown in Figs. 4 and 5), or by tapping it at some convenient point as shown for bolt 12 Fig. 1 and 28 Fig. 2, with nuts and washers as required, for attaching the protectively coated wire lugs 13 and 29, respectively. The other side of the circuit is attached to similar wire lugs, 14 Fig. 1 and 30 Fig. 2, held in place by nuts 15 and 31, with check-nuts and washers as required, on bolts 5 and 21, respectively, which are insulated from the encasement by composition plugs 3 and 19. A threaded insulating bushing instead of a composition plug accomplishes the same purpose, (as shown in Fig. 5), in which case both end pieces in either figure may be metal. The plugs 4 and 20 are the same polarity as the encasement.

The operating member in Fig. 1 is a partly threaded metal rod 7 with an eye-hole or loop in the suspended end, which links with the eye-nut 8 supported on bolt 5, and is free to swing in any direction of the compass. Either 7 or 8 may be open-link for assembling. The operating member in Fig. 2 is a conducting liquid 23, such as mercury or a metalic solution, which is free to run into any part of the grounded encasement according as it is moved.

In Fig. 1, 9 is a weight, which may preferably consist of two or more nuts, threaded on to the rod 7 to ensure good contact with pole 10 (described later) when the encasement is moved to the tipping angle. In Fig. 2 a metal disk, 24, held centrally on bolt 21 by nuts 25, ensures liquid contact with insulated bolt 21 and the encasement when the latter is tipped or moved into a horizontal position. Enough liquid is inserted to ensure such contact when the encasement is inverted.

In Fig. 1, 10 is a metal cone-cup-shaped pole or electrical terminal, or pressed ring of varying internal diameter, rigidly supported on the end of threaded bolt 6 by nuts 11. It limits the swing of operating member 7 to the tipping angle shown by the oblique dash line A—B. By turning either of the bolts 5 or 6 the tipping angle can be varied.

In Fig. 2, 26 is an inverted iron cup-shaped pole or electrical terminal, rigidly supported on bolt 21 by nuts 27. It has equally-spaced flaring pendent finger tips to dip into the operating liquid 23, when the tipping angle, shown also by the oblique dash line C—D, is attained. Similarly as in Fig. 1, the tipping angle can be varied by turning either the top bolt 21, or by turning the lower bolt 22 which allows a varying amount of the conducting liquid 23 in the tap hole of plug 20 to be moved toward or away from the contact fingers of pole 26. By making the end pole-bolts 5, 6, and 21, 22, all the same size, the nuts and lock-nuts may also be the same size. They are all tightened in assembling when the final adjustments are made for a predetermined tipping angle. All parts of the switch and its encasement, excepting the operating liquid, poles 10 and 26, and the required composition plug or bushing, can be made by fitting standard stock pieces of commercial hardware material.

The ends of the encasement are sealed as shown at 16 in Fig. 1, and 32 Fig. 2, by a water-proof sealing compound. All exposed metal parts in either figure are painted to prevent corrosion, and then covered with a hardening composition cement shown in dotted curved lines, 33 and 34 at top and bottom ends, in each figure, and the whole body, of whatever shape, including the terminal lugs to which the properly insulated wire leads are soldered, may be dipped in a dry-hard tar cement, not shown.

To ensure an easy tipping or swinging of the encasement when the supporting material is moved or removed, the wire leads are made amply long and flexible, and are brought to the switch detector from below when it is installed in an earthy mass for open circuit operation. For closed circuit operation, when installed in an earthy mass, the wire leads are brought to the switch detector from above, and the encasement, set at a desired tipping angle, then swings to a vertical or open circuit position when the supporting material is removed.

Figure 3:
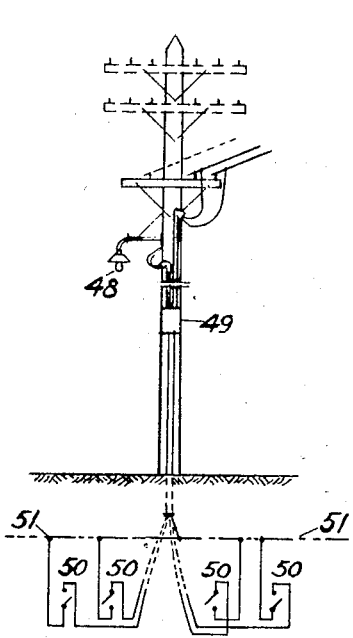

Figure 3 shows diagrammatically an application of this switch detector in a sub-surface or concealed position. Similar connections as herein described can be applied to it when installed in a super-surface or exposed position, serving the same purpose of detecting mass-movements. It can be installed for either open or closed circuit operation on a 2-wire or 3-wire supply line, with any low voltage to which an indicating signal, light or semaphore, may be adapted. Here the signal shown is an incandescent lamp, 48. The supply circuit may be installed, where permissible, on a new or existing pole line, or concealed in a conduit hidden or exposed, or it may be buried as a parkway table, not shown, to or between signal points, in which latter case the circuit would enter the control, fused, switch-box, 49, from below instead of above as shown. The wire leads are run in conduit to and from the box 49, which serves also for the testing and distribution of switch detectors, 50, 50. A location plan, including their depth if the encasements are planted, is kept for record. The service box 49 is placed some distance above the ground, according to regulation, or in any other secure location. In box 49 are wire connecting terminals, one for each switch detector installed in series with the signal. The neutral is run from the service switch in 49 to the concealed or buried ground wire, 51, 51, to which any desired number of installed detectors can be connected. A positive lead (or either outside wire of a 3-wire system) is run separately from the insulated pole of each installed detector to a wire terminal in box 49, thence one common conductor for all of them to the signal and back to the supply switch. For testing, by removing or inserting individual plugs, or disconnecting and reconnecting one by one each positive lead in turn in the box, the particular switch or switches that operate on the signal can be located on the record plan to find the disturbing agent or agents.

A further application of this switch detector can be made by installing it in, or attached to, the structure of, or pertaining to, a vehicle, an automobile, a boat, an airplane, a submarine vessel, or an elevating gun to indicate the angle of difference between the normal, horizontal, upright or oblique positions or position of said structure and its moving momentary or working position when a predetermined or incidental tipping angle is attained.

Claims: In this invention and appertaining thereto, I claim:

1. In a detector of mass movements by change in vertical inclination, a casing, a fixed terminal in one end of the casing, a terminal in the opposite end of the casing, means to adjust the position of the last named terminal in its approach toward and into electrical connection with said fixed terminal, said fixed terminal being a flaring circular cup-shaped conducting member concentric with the opposite terminal in its normal position, and an electric signal circuit connected with said terminals.

2. In a detector of mass movements by change in vertical inclination, a casing, an adjustable support in the top thereof, a freely-movable conducting pendulum carried by the support, an adjustable hollow conical stationary contact in the base surrounding the free end of the pendulum, and an electrical signal circuit connected with said pendulum and said conical contact.

In testimony whereof I affix my signature.

THOMAS M. ROBERTS.